United States Patent [19]
Yu

[11] Patent Number: 6,000,541
[45] Date of Patent: *Dec. 14, 1999

[54] CONTAINER FOR CASSETTE OR THE LIKE

[76] Inventor: Jack Yu, No. 109-1, Avenue 6, Lane 164, Tzong Sa Road, Da Du Hsiang, Taichung Hsien, Taiwan

[ * ] Notice: This patent is subject to a terminal disclaimer.

[21] Appl. No.: 09/126,966

[22] Filed: Jul. 31, 1998

Related U.S. Application Data

[63] Continuation-in-part of application No. 08/931,333, Sep. 16, 1997, Pat. No. 5,819,930, which is a continuation-in-part of application No. 08/774,678, Dec. 26, 1996, Pat. No. 5,706,939.

[51] Int. Cl.[6] .................................................... B65D 85/57
[52] U.S. Cl. ...................... 206/308.1; 206/309; 206/511; 312/9.16; 312/9.48
[58] Field of Search ................................ 206/307, 308.1, 206/310, 311, 312, 308.3, 387.1, 387.12, 493, 509, 511; 312/9.11, 9.16, 9.21, 9.22, 9.26, 9.47, 9.48; 220/345.1, 348

[56] References Cited

U.S. PATENT DOCUMENTS

| | | | |
|---|---|---|---|
| 4,265,369 | 5/1981 | Aboussouan | 221/87 |
| 4,828,341 | 5/1989 | Bohnet et al. | 312/12 |
| 5,706,939 | 1/1998 | Yu | 206/308.1 |
| 5,706,943 | 1/1998 | Yu | 206/387.12 |
| 5,819,930 | 10/1998 | Yu | 206/308.1 |

*Primary Examiner*—Paul T. Sewell
*Assistant Examiner*—Nhan T. Lam
*Attorney, Agent, or Firm*—Charles E. Baxley

[57] ABSTRACT

A container includes a cover secured on a base for receiving an insert and a knob slidably received in the base. A latch is slidably engaged in the base and biased to secure the insert in place. The knob includes a tapered surface for disengaging the latch from the insert. A spring is biased with the insert for biasing the insert outward of the base. The spring is solidly secured to the base. The knob can be prevented from being depressed inward of the cover inadvertently when a number of containers are stacked with each other.

3 Claims, 6 Drawing Sheets

CONTAINER FOR CASSETTE OR THE LIKE

The present invention is a continuation-in-part of U.S. patent application Ser. No. 08/931,333, filed Sep. 16, 1997, now U.S. Pat. No. 5,819,33, which is a continuation-in-part of U.S. patent application Ser. No. 08/774,678, filed Dec. 26, 1996, now U.S. Pat. No. 5,706,939.

BACKGROUND OF THE INVENTION

1. Field of the Invention

The present invention relates to a container, and more particularly to a container for storing tape cassettes or the like.

2. Description of the Prior Art

Typical disc containers comprise a base for storing disc and a cover pivotally coupled to the base for covering the disc. The cover includes a front button for controlling the outward movement of the base. However, the spring for biasing the base outward of the container may not be stably retained in place, and the latch device may not be effectively operated.

The present invention has arisen to mitigate and/or obviate the afore-described disadvantages of the conventional disc containers.

SUMMARY OF THE INVENTION

The primary objective of the present invention is to provide an improved container that may be easily opened and closed.

In accordance with one aspect of the invention, there is provided a container for tape cassette comprising a base including a front portion having a first corner area and including a rear portion having a rear wall, the base including a chamber and a channel provided in the first corner area of the base, an insert slidably engaged in the base, the insert including a notch, a cover secured on the base for retaining the insert in the base, a latch slidably engaged in the channel of the base for engaging with the notch of the insert and for retaining the insert in place relative to the base, the latch including an extension extended upward, means for biasing the latch to engage with the notch of the insert and for retaining the insert in place relative to the base, a knob slidably engaged in the chamber and having a tapered surface for engaging with the extension of the latch and for moving the latch away from the insert against the latch biasing means and for disengaging the latch from the notch of the insert when the knob is depressed inward of the chamber, a spring engaged between the rear wall of the base and the insert for biasing the insert forward and outward of the base, the spring including a rear segment, and means for securing the rear segment of the spring to the base. The insert is allowed to be biased forward and outward of the base by the spring when the latch is disengaged from the notch of the insert by the knob.

The base includes a retainer and a pin formed in the rear portion of the base and close to the rear wall of the base, the rear segment of the spring includes an end portion for engaging with the retainer and includes a bent portion engaged with the pin, for allowing the rear segment of the spring to be stably secured in place to the base.

A bar is further provided and formed in the rear portion of the base and close to the rear wall of the base and close to the pin, the bent portion of the rear segment of the spring is engaged between the pin and the bar for allowing the rear segment of the spring to be stably secured in place to the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 7:
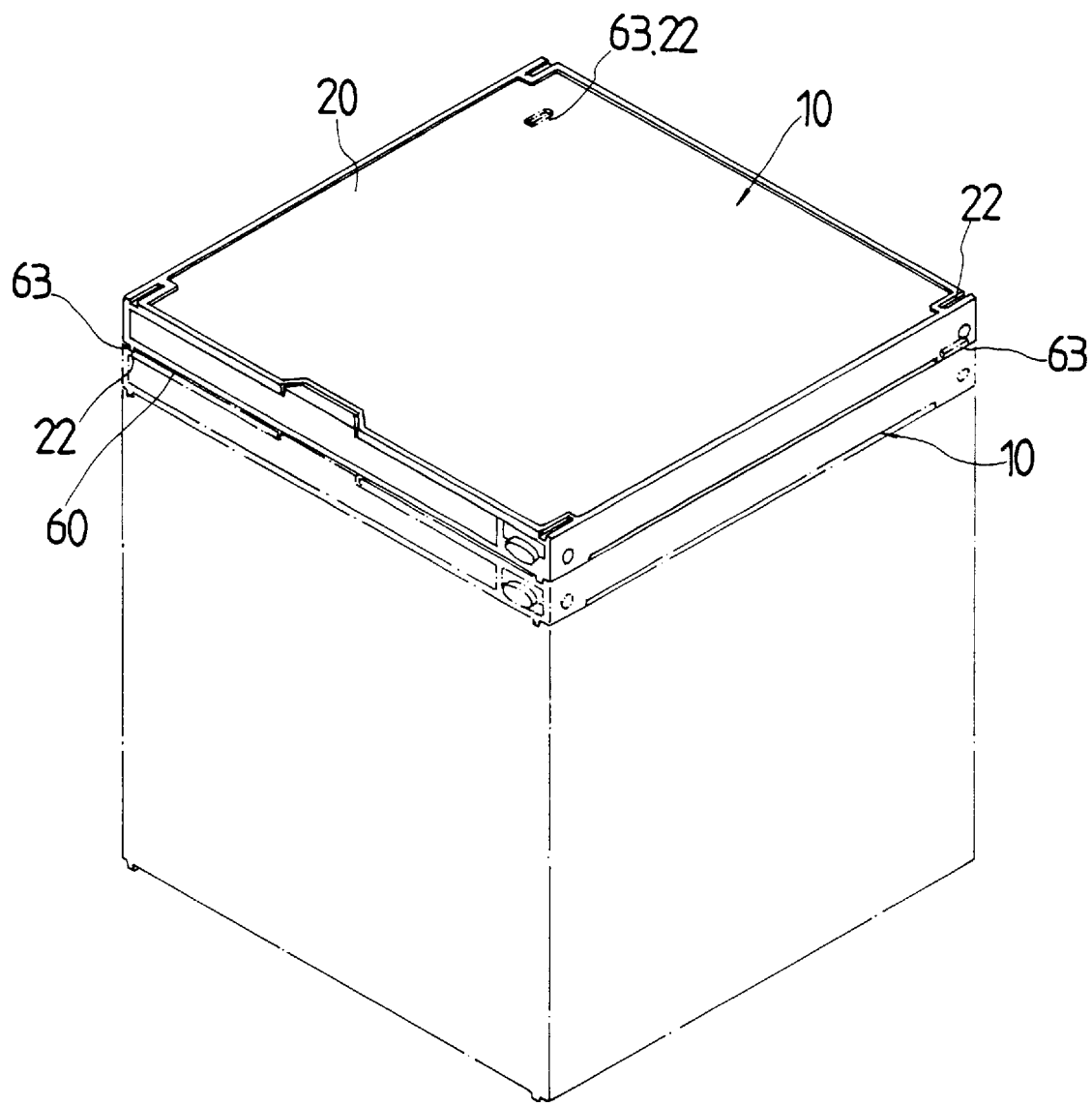
FIG. 7 is a perspective view illustrating the operation of the container.

Referring to the drawings, and initially to FIGS. 1 to 4, a container in accordance with the present invention comprises a base 60 including four projections 62 provided on the four corner areas and including a rear portion having a wall 602 extended upward. A cover 20 includes four holes 21 for receiving the projections 62 and for allowing the cover 20 to be easily secured to the base 60. The base 60 includes a retainer 64 and a pin 65 and a bar 66 formed in the rear portion close to the wall 602 for engaging with and for securing the rear segment of a spring 40 in place. The cover 20 includes four depressions 22 formed in top of the four corners. The base 60 includes four bulges 63 extended downward from the four corners for engaging with the depressions 22 of the cover 20 and for allowing two or more containers to be stably stacked with each other (FIG. 7). The base 60 includes two front corners each having a rib 67 and a protrusion 68 provided thereon respectively.

The base 60 includes a chamber 61 formed and provided on one of the front corners of the base 60 for slidably receiving a knob 51 which includes a tapered surface 511. A channel 611 is formed and provided behind the chamber 61. A latch 52 is slidably engaged in the channel 611 and includes an extension 521 extended upward for engaging with the tapered surface 511. A spring 53 is engaged with the knob 51 for biasing the knob 51 outward of the chamber 61 and inward of the base along a longitudinal path, and for biasing the extension 521 of the latch 52 to engage with the tapered surface 511 of the knob 51 and to move the knob 51 outward of the base 60 by the engagement of the extension 521 with the tapered surface 511.

An insert 30 is slidably engaged between the base 60 and the cover 20 and includes a flexible disc retaining hub 302 provided in the center portion. The cover 20 may stably retain the insert 30 in the base 60. The insert 30 includes a seat 34 for receiving the other end or the bent end 46 of the spring 40 which is engaged between the insert 30 and the wall 602 for biasing the insert 30 outward of the base 60. The insert 30 includes a shoulder 32 formed in one of the side portions for slidably engaging with the rib 67 of the base 60 and for guiding the sliding movement of the insert 30 relative to the base 60. The insert 30 includes a stop 31 for engaging with the protrusion 68 and for preventing the insert 30 from disengaging from the container. The insert 30 includes a notch 33 for receiving the latch 52 which may retain the insert 30 in the base 60.

Figure 1:
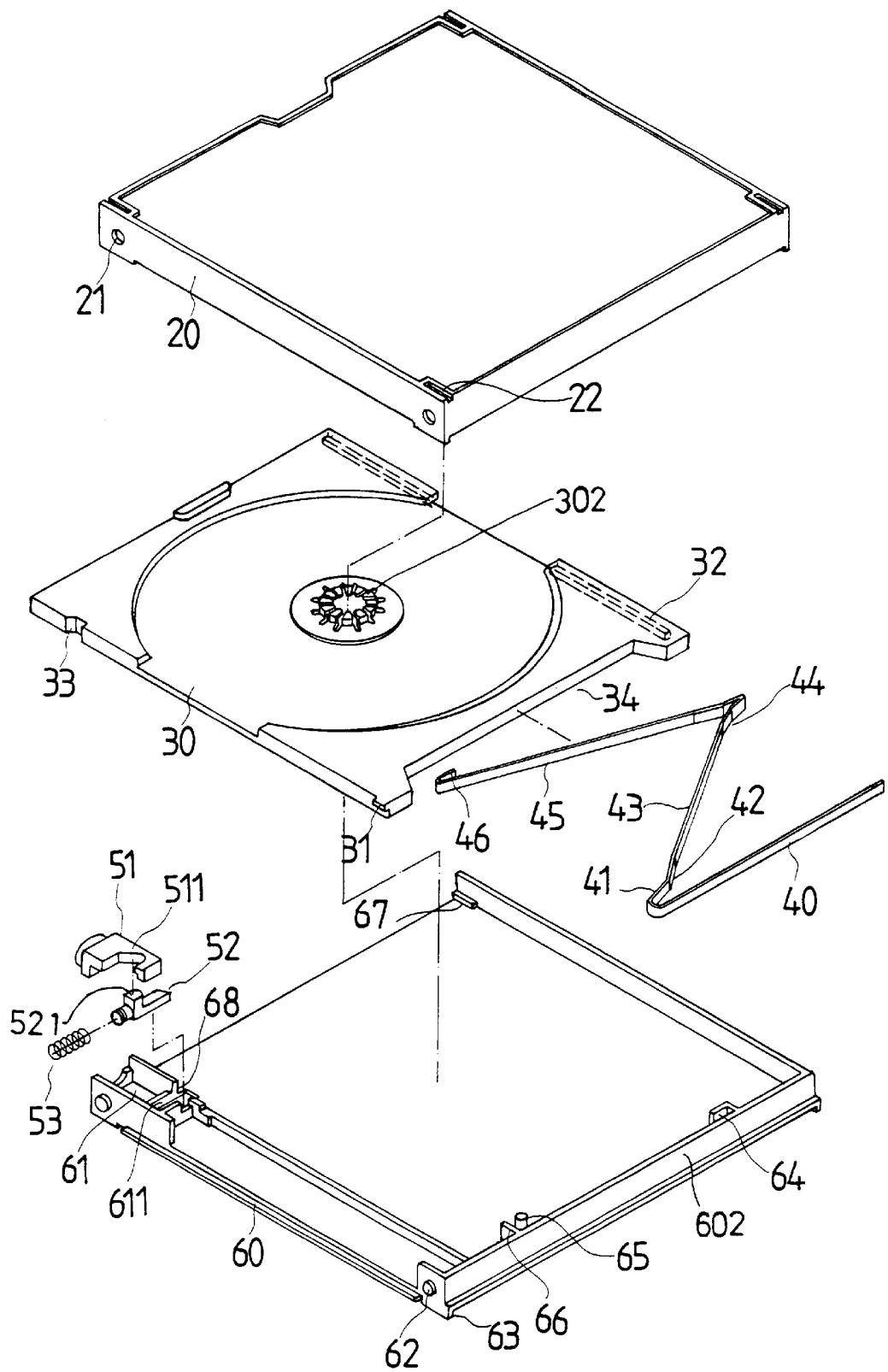
FIG. 1 is an exploded view of a container in accordance with the present invention.
Figure 2:
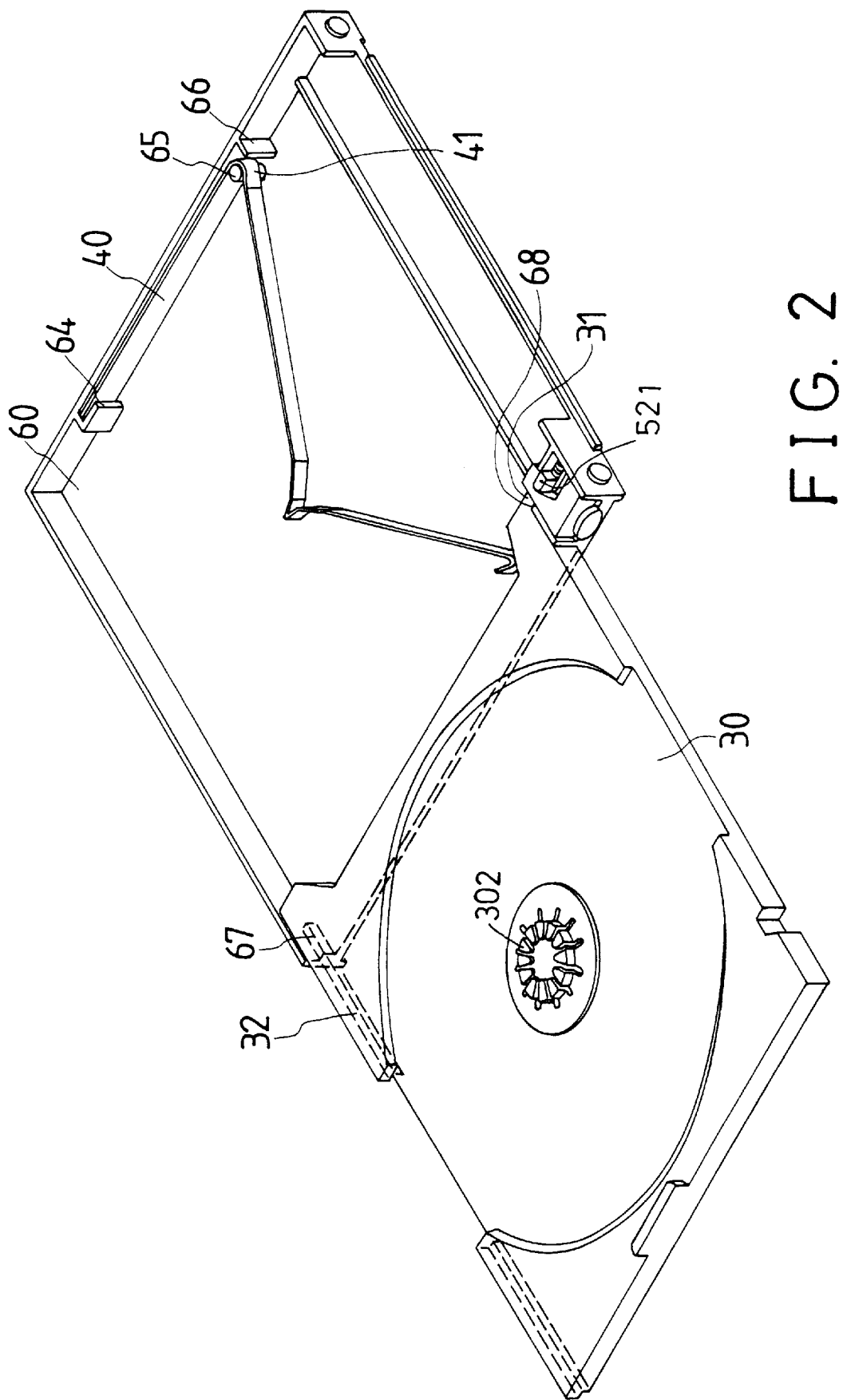
FIG. 2 is a top perspective view of the container, in which the cover is removed and the insert is moved outward of the base for showing the interior structure of the container.
Figure 3:
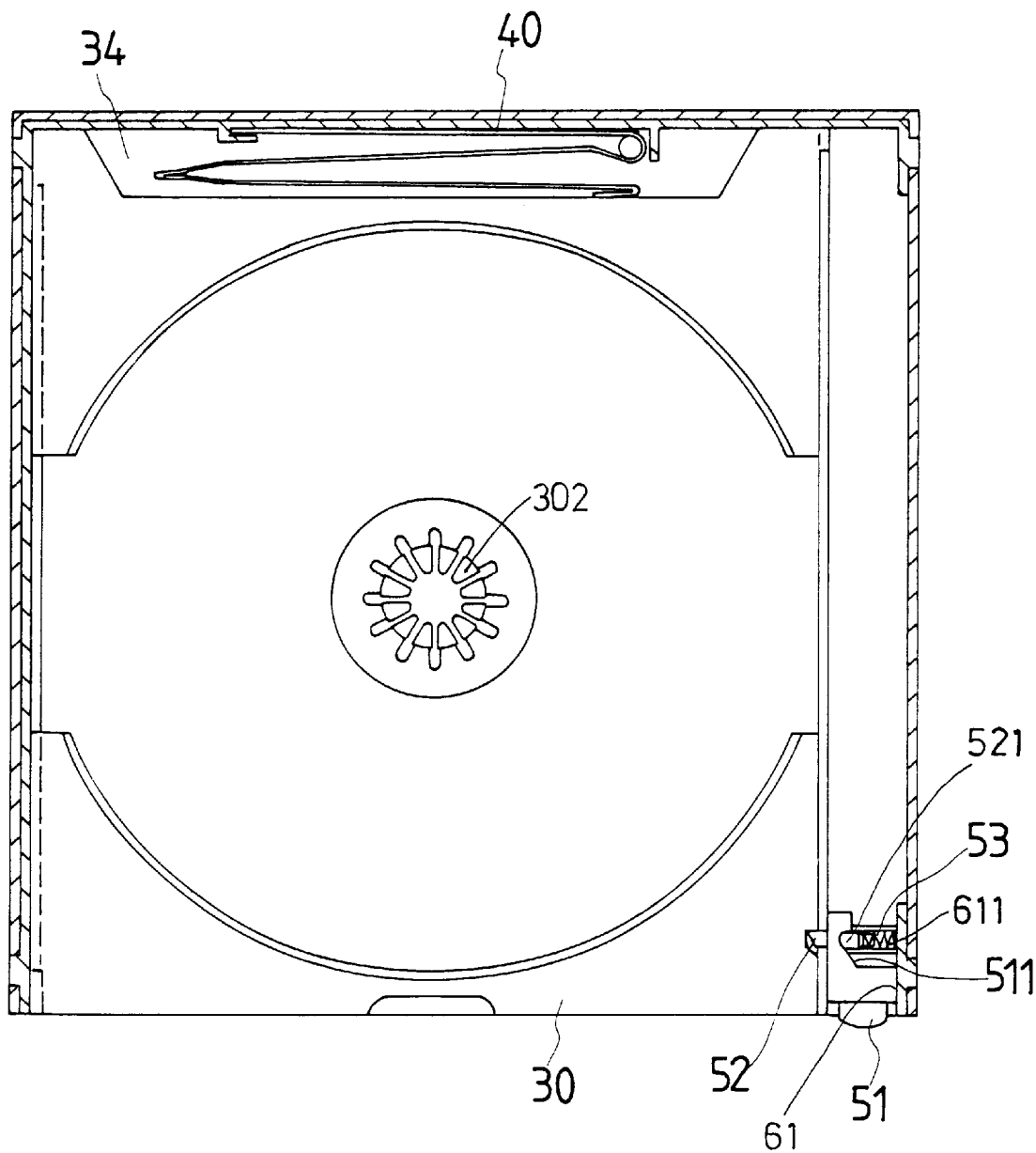
FIG. 3 is a cross sectional view taken along lines 3—3 of FIG. 5.
Figure 4:
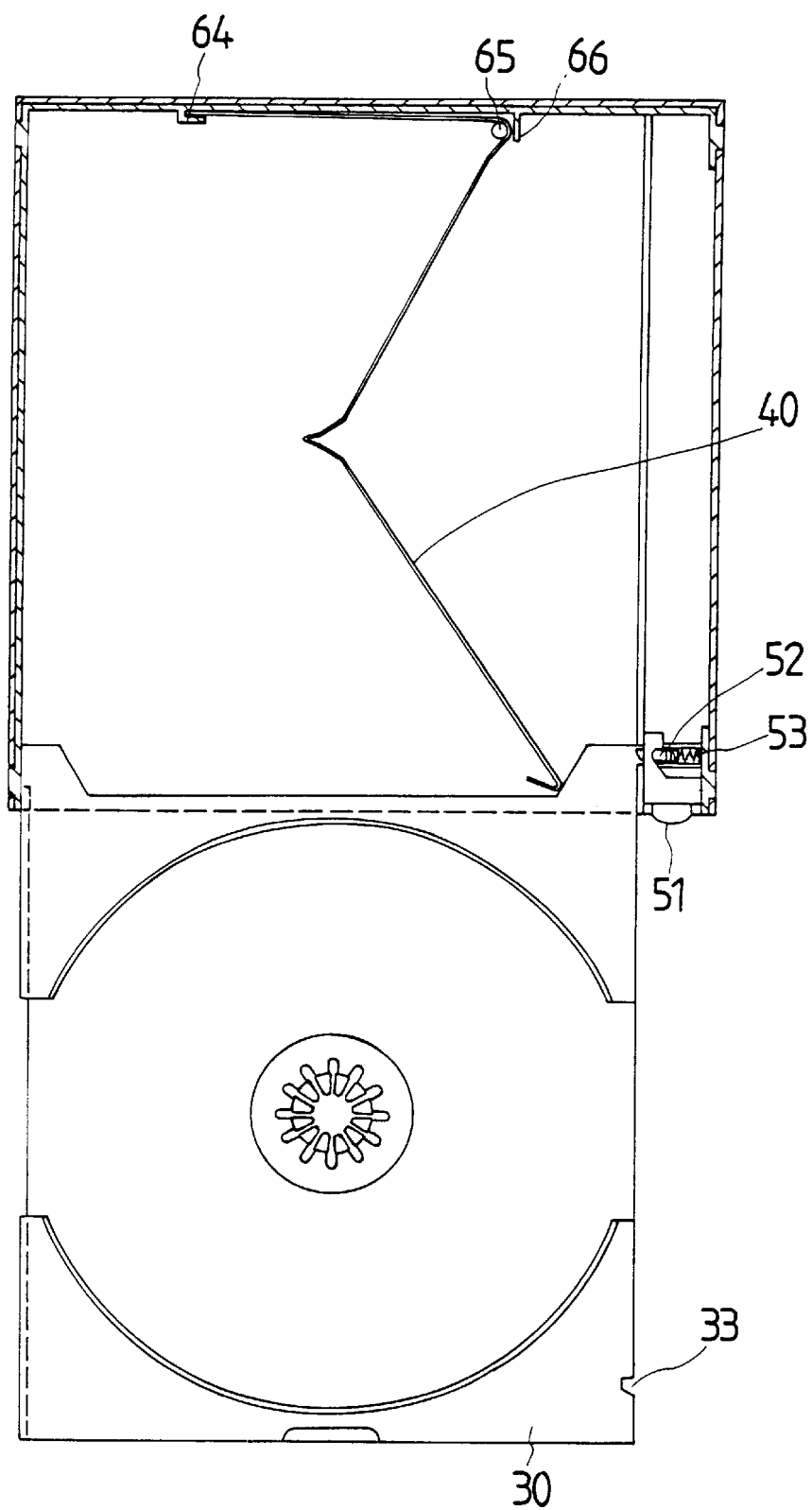
FIG. 4 is a cross sectional view similar to FIG. 3, illustrating the operation of the container.
Figure 5:
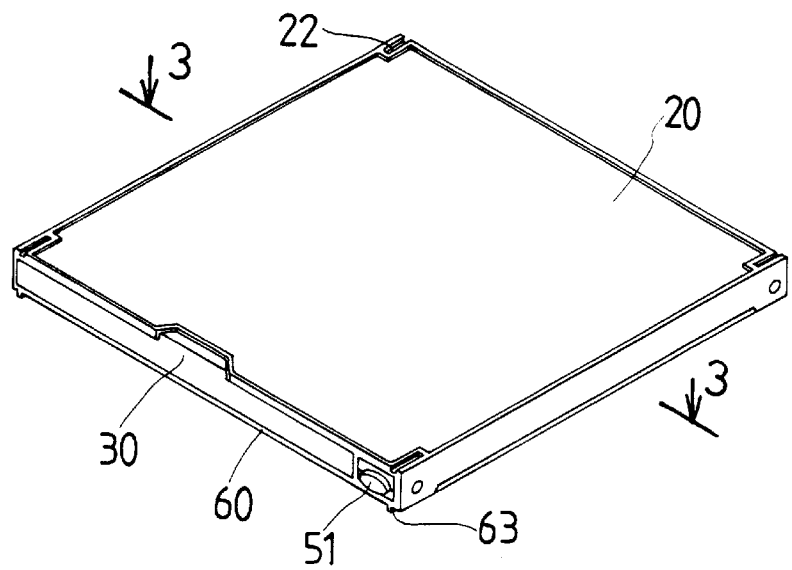
FIGS. 5 and 6 are perspective views illustrating the operation of the container, in which the container is rotated for 180 degrees relative to FIG. 1.
Figure 6:
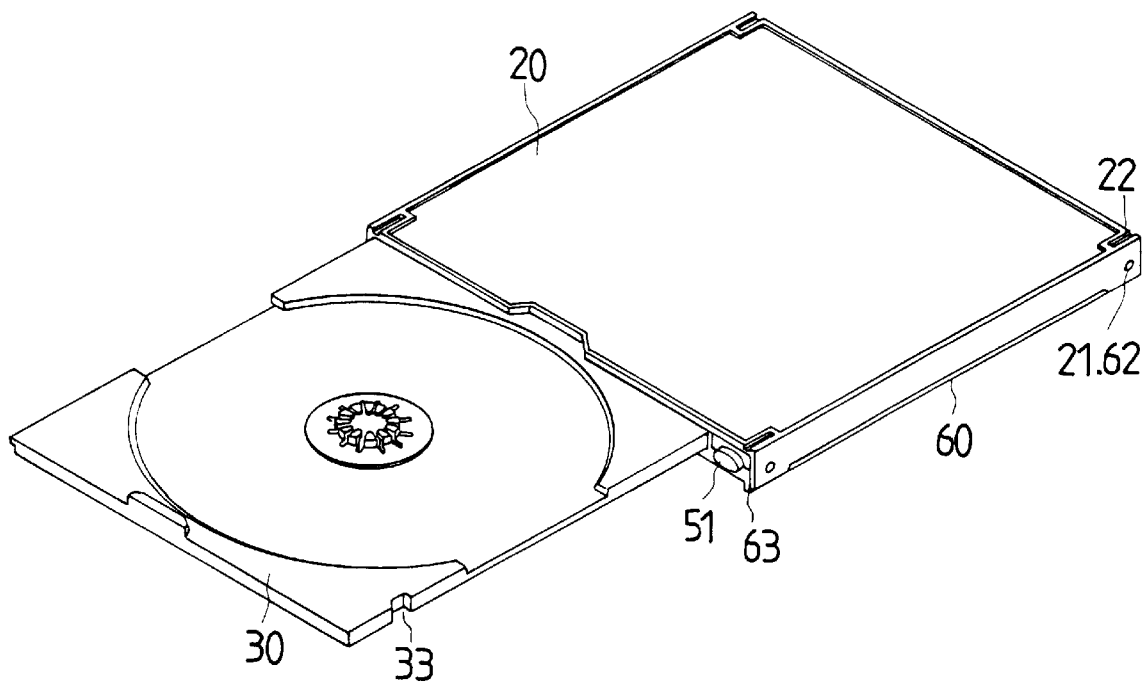

The rear segment of the spring 40 includes an end portion engaged with the retainer 64 and includes the bent portion 41 for engaging with the pin 65 and the bar 66 and for allowing the rear segment of the spring 40 to be stably retained in place to the base 60. The spring 40 includes a middle segment 43 formed between the bent portion 41 and the other bent portion 44. It is preferable that a tapered portion 42 is formed between the middle segment 43 and the bent portion 41 for increasing the resilience of the spring 40 (FIGS. 3, 4). The spring 40 includes an outer segment 45 having the bent end 46 for engaging with the seat 34 of the insert 30, and includes a Z-shaped configuration (FIGS. 1, 3) for allowing the spring 40 to includes an excellent resilience.

In operation, as shown in FIGS. 2–6, when the insert 30 is moved inward of the base 60, the latch 52 may be biased by the spring 53 to engage with the notch 33 of the insert 30 for retaining the insert 30 in the base 60 (FIG. 3). When the knob 51 is depressed inward of the cover 20, the tapered surface 511 of the knob 51 may move the latch 52 away from the insert 30 against the spring 53 for disengaging the latch 52 from the notch 33 of the insert 30 and for allowing the insert 30 to be moved outward of the base 60 by the spring 40, such that the container may be easily opened with only one hand.

As shown in FIG. 7, the knob 51 may be easily depressed by the user when the containers are superposed with each other such that the insert 30 of the middle containers may also be easily opened.

Accordingly, the container in accordance with the present invention includes an insert which may be easily opened and operated with only one hand even when a number of containers are superposed with each other. In addition, the knob 51 is facing forward and may thus be prevented from being depressed inward of the cover 20 by the other containers when a number of containers are stacked or superposed with each other. The latch may be effectively operated and biased to move along a longitudinal path by the spring 53.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A container comprising:

a base including a front portion having a first corner area and including a rear portion having a rear wall, said base including a chamber and a channel provided in said first corner area of said base, an insert slidably engaged in said base, said insert including a notch, a cover secured on said base for retaining said insert in said base, a latch slidably engaged in said channel of said base for engaging with said notch of said insert and for retaining said insert in place relative to said base, said latch including an extension extended upward, means for biasing said latch to engage with said notch of said insert and for retaining said insert in place relative to said base, a knob slidably engaged in said chamber and having a tapered surface for engaging with said extension of said latch and for moving said latch away from said insert against said latch biasing means and for disengaging said latch from said notch of said insert when said knob is depressed inward of said chamber, a spring engaged between said rear wall of said base and said insert for biasing said insert forward and outward of said base, said spring including a rear segment, and means for securing said rear segment of said spring to said base, said insert being allowed to be biased forward and outward of said base by said spring when said latch is disengaged from said notch of said insert by said knob.

2. The container according to claim 1, wherein said base includes a retainer and a pin formed in said rear portion of said base and close to said rear wall of said base, said rear segment of said spring includes an end portion for engaging with said retainer and includes a bent portion engaged with said pin, for allowing said rear segment of said spring to be stably secured in place to said base.

3. The container according to claim 2 further comprising a bar formed in said rear portion of said base and close to said rear wall of said base and close to said pin, said bent portion of said rear segment of said spring is engaged between said pin and said bar for allowing said rear segment of said spring to be stably secured in place to said base.

\* \* \* \* \*